United States Patent [19]

Harvey et al.

[11] E Re. 30,859

[45] Reissued Feb. 2, 1982

[54] BOWLING PRACTICE DEVICE

[76] Inventors: Leslie E. Harvey, 954 Henderson Ave.; Stephan D. Spiva, 1247 Balboa Ct., both of Sunnyvale, Calif. 94086

[21] Appl. No.: 72,335

[22] Filed: Sep. 4, 1979

Related U.S. Patent Documents

Reissue of:

[64] Patent No.: 4,046,376
Issued: Sep. 6, 1977
Appl. No.: 698,952
Filed: Jun. 23, 1976

[51] Int. Cl.[3] ..... A63D 5/00

[52] U.S. Cl. ..... 273/54 D; 273/48

[58] Field of Search ..... 273/54 D, 48, 53; 272/56.5 R; D21/244

[56] References Cited

U.S. PATENT DOCUMENTS

| | | | |
|---|---|---|---|
| D. 207,105 | 3/1967 | Gale | D21/244 |
| 2,016,891 | 10/1935 | Clarke | 272/56.5 R UX |
| 2,048,942 | 7/1936 | McConnell | 273/149 R |
| 2,994,968 | 8/1961 | Phillips | 273/48 X |
| 3,396,968 | 8/1968 | Ciccone et al. | 273/54 D |
| 3,445,111 | 5/1969 | Powell | 273/53 X |

FOREIGN PATENT DOCUMENTS

| | | | |
|---|---|---|---|
| 242072 | 12/1962 | Australia | 273/48 |

*Primary Examiner*—Anton O. Oechsle
*Attorney, Agent, or Firm*—Warren M. Becker

[57] ABSTRACT

A bowling practice device *(1)* having a ramp *(2)* with a concave upwardly sloping inclined surface and a pad *(5)* located at the top of the ramp *(2)* for stopping forward motion of a bowling ball *(32)*, and causing the ball *(32)* to roll in a reverse direction down the ramp *(2)* and toward a bowler. Means *(10,11,12)* are also provided for supporting the ramp *(2)* in a free-standing manner on a horizontal surface and for preventing movement of the ramp *(2)* relative to the surface [upon an] *on* impact by the ball *(32)*.

17 Claims, 4 Drawing Figures

BOWLING PRACTICE DEVICE

Matter enclosed in heavy brackets [ ] appears in the original patent but forms no part of this reissue specification; matter printed in italics indicates the additions made by reissue.

BACKGROUND OF THE INVENTION

The present invention is related to sporting equipment in general and in particular to a device for practicing bowling.

Many persons interested in learning a sport or in improving their proficiency in a sport with which they are familiar employ practice devices. In golf, for example, there is available for practice plastic golf balls which, when struck, travel but a short distance and are generally safe to be used in relatively confined areas. The action of the ball, when struck, relates to the player the nature of the strike and whether or not an improvement in this regard should be made. Also in golf there is provided apparatus for improving putting which may be used on a horizontal surface such as, for example, a living room floor or the like. Some of the putting practice devices employ electro-mechanical means for returning a putted ball to the putter. In the sport of tennis, ball machines and backboards are employed for the purpose of teaching the sport to a new player and for the purpose of improving the skills of an experienced player. The sport of baseball also employs ball machines. In baseball, the ball machine takes the form of a pitching machine for "throwing" a ball to a batter.

Heretofore, in the sport of bowling, a person who desired to learn the game or practice and improve certain skills in bowling, such as, for example, the swing, the release and the follow-through, have had to attend a conventional bowling alley. When attending a conventional bowling alley, it is frequently necessary to pay for each line of bowling and, as is the case in many sports, the cost of the lines is increasing and in many areas has increased to a level where it is becoming impractical, or at least highly burdensome to pay the cost in order to practice certain skills. Moreover, with the ever-increasing popularity of the sport of bowling, which has given rise to an ever-increasing number of leagues which use the available bowling alley, it is becoming more and more difficult to obtain the use of a bowling alley at a convenient time.

SUMMARY OF THE INVENTION

In view of the foregoing, a principal object of the present invention is a bowling practice device suitable for practicing certain bowling skills.

Another object of the present invention is a bowling practice device suitable for home use.

Still another object of the present invention is a bowling practice device which automatically returns the ball to the bowler.

Still another object of the present invention is a bowling practice device which may be used on a conventional home floor, rug or carpet.

Still another object of the present invention is a bowling practice device which is relatively light-weight and portable, simple in design, inexpensive to manufacture, rugged in construction, easy to use and efficient in operation.

DESCRIPTION OF THE DRAWINGS

The above and other objects, features and advantages of the present invention will be apparent to those skilled in the art from the following description of a preferred embodiment as shown in the drawings in which.

DETAILED DESCRIPTION OF THE DRAWINGS

Figure 1:
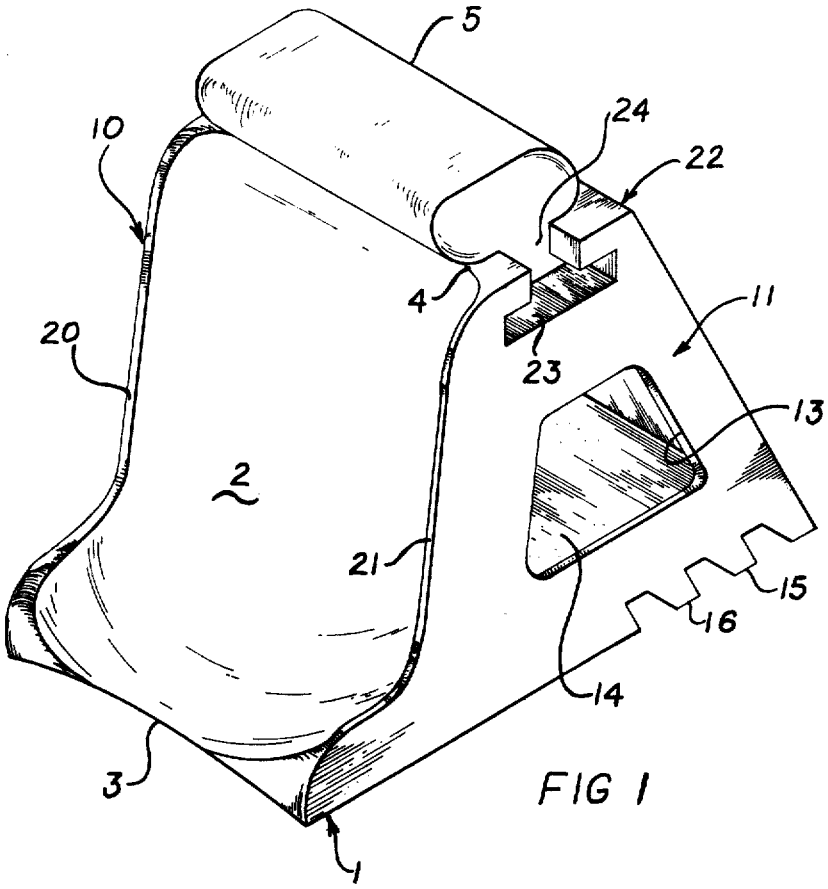
FIG. 1 is an isometric view of a bowling practice device according to the present invention.

Referring to FIG. 1, there is provided, in accordance with the present invention, a bowling practice device designated generally as 1. Device 1 comprises a ramp 2 having a lower forward edge 3, and an upper edge 4. The ramp 2 also comprises a generally upwardly sloping concave inclined surface extending from the lower edge 3 to the upper edge 4, which is generally symmetrical about the longitudinal axis of the ramp.

Adjacent to and extending along the upper edge 4 of the ramp 2 there is provided an elongated cushion or pad member 5. Pad 5 is provided for absorbing the unspent energy of a bowled ball and returning it to its bowler.

To support the ramp and pad member in a free-standing manner on a horizontal surface, the device 1 is provided with a pair of spaced side members 10 and 11 and a back member 12. In a preferred embodiment of the invention each of the side member 10 and 11 and rear member 12 comprise a wall-like member. For making the device 1 lighter without seriously compromising its mechanical strength and rigidity, there is also provided in the wall members 10 and 11 a hole 13. Members 10, 11 and 12 are fitted together in a rigid manner when the device 1 is in use so as to prevent relative motion between the members and the ramp 4 when a bowling ball impacts the ramp.

Extending between the side wall members 10 and 11 and forward of the rear member 12 is a base member 14. Extending downwardly from the base member 14 are a plurality of elongated parallel louver-like members 15 and 16. Members 15 and 16 extend laterally across the bottom of the device 1 and are provided with an edge 17 and 18, respectively, which cooperate with a corresponding pair of parallel edges 19 and 20 for engaging the surface on which the device 1 is placed so as to prevent relative movement between the device 1 and the surface upon impact of the device by a ball. It is to be understood, however, that various other means for preventing or reducing relative movement between the device 1 and a horizontal surface on which it is sitting may be employed. For example, the base of the wall members 10, 11 and 12 may be fitted with a material having a high coefficient of friction which cooperates with the horizontal surface on which the device is sitting for preventing relative movement therebetween. Indeed, in semi-permanent or permanent installations the device 1 may be glued, nailed or otherwise fixedly attached to the horizontal surface. In those cases, the louver-like member 15 and 16 may be omitted.

The ramp 2, in addition to its top and bottom edges 3 and 4, is also provided with a pair of spaced side edges from which extends a rib member 20 and 21. Members 20 and 21 are provided for preventing undesired lateral movement of a ball over the side edges of the ramp 2.

Referring to the top of the device 1, there is provided a top portion 22. In the top portion 22 there is provided a female engaging means comprising an elongated T-shaped cavity 23. Extending from the bottom of the pad member 5 there is provided an elongated male engaging means comprising a comparable T-shaped extension 24. T-shaped extension 24 is adapted to fit in the T-shaped cavity 23 for retaining the pad member 5 in a fixed position relative to the top of the inclined ramp 2.

Figure 4:
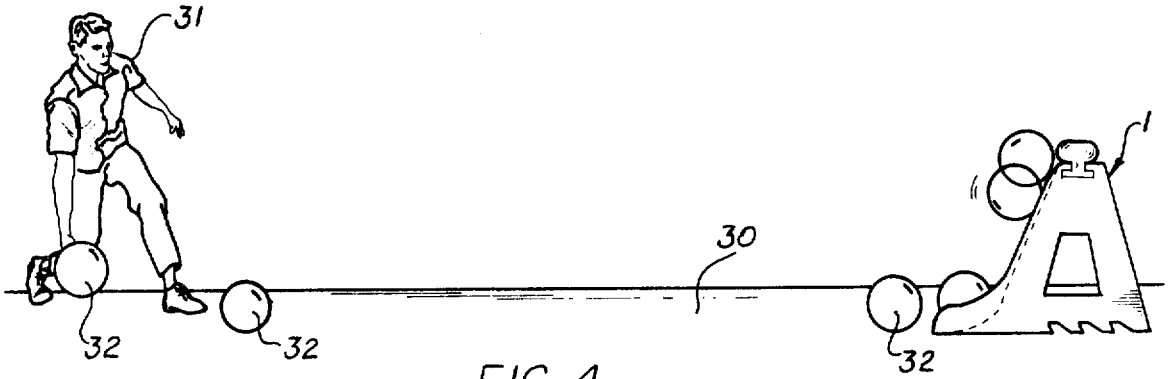
FIG. 4 is a profile sketch of the device of FIGS. 1–3 in use.
Figure 2:
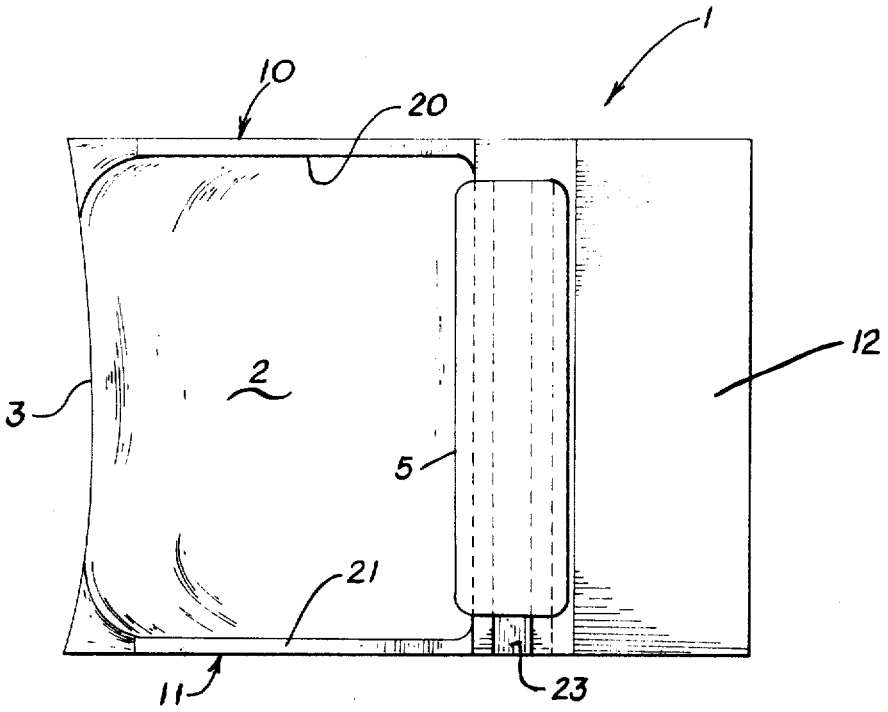
FIG. 2 is a top view of FIG. 1.
Figure 3:
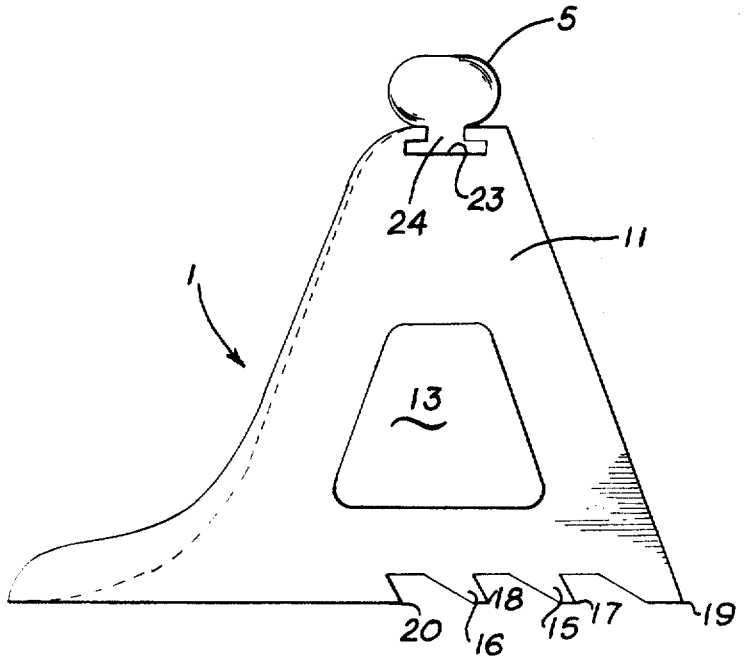
FIG. 3 is a profile view of FIG. 2.

Referring to FIG. 4 there is shown an illustration of the device 1 in use.

In use the device 1 is placed on a surface 30. Surface 30 may comprise a horizontal hardwood surface such as that found in a bowling alley, a wood surface such as that used as a floor in a home, a ground surface such as a clay surface and the like. A surface on which is placed a rug or carpet may also be used. Each surface, it may be noted, may be expected to result in different action of the ball. A bowler 31 standing a reasonable distance from the front of the device 1 delivers a bowling ball 32 in a normal fashion toward the device 1 and in particular toward the inclined surface 2 of the ramp. As the ball 32 engages the lower edge 3 of the ramp 2, the ball is directed upwardly. As the ball is directed upwardly, its forward velocity is reduced. Any unspent energy of the ball, as it approaches the pinnacle of the device, is absorbed by the pad 5. Pad 5 may be made of a variety of materials such as horsehair, a stiff foam material or any other material found suitable for the purpose. After the forward energy of the ball is absorbed by the pad 5, the ball is caused to fall downwardly and is directed to the bowler by the concave surface of the ramp 2.

The foregoing is considered as illustrative only of the principles of the invention. Since numerous modifications and changes will readily occur to those skilled in the art, it is not desired to limit the invention to the exact construction and operation shown and described, but to include as may substitutions as may be incorporated in the embodiment described without departing from the spirit and scope of the invention incorporated therein. For example, the device shown and desribed is a rigid device comprising fixed wall members 10, 11 and 12 with a fixed inclined ramp surface 2. It is apparent that, by means well known to those skilled in the art, the device 1 could be constructed in a fashion that would permit the wall members 10, 11 and 12 to collapse relative to one another so as to reduce the overall size of the device for purposes of storage and transportation. For example, the rear member 12 may be fitted to side members 10 and 11 by means of a tongue and groove and the rear members 10 and 11 may be attached to the ramp 2 by means of hinges. If so constructed, the wall members 10 and 11 could be folded relative to one another upon the removal therefrom of the rear member 12 with an appropriate and corresponding disposition being made of the base member 14. Accordingly, it is intended that the scope of the invention not be limited to the embodiments described but be determined by reference to the claims hereinafter provided and their equivalents.

What is claimed is:

1. A bowling practice device comprising:

means forming an inclined ramp for receiving a rolling bowling ball delivered by a bowler, said ramp having a lower forward edge, a pair of spaced side edges and an upper edge and a generally upwardly sloping inclined surface extending from said lower forward edge to said upper edge, the lower half of said inclined surface being generally concave in that it is curved symmetrically upwardly from its midpoint toward each of said side edges along substantially its entire length and curved upwardly from said lower forward edge toward said upper edge with respect to at least the lower half thereof for centering a ball striking the device between said side edges; and means forming a pad at said upper edge of said inclined surface for stopping the forward motion of said ball, and causing said ball to roll in a reverse direction down said ramp toward said bowler.

2. A device according to claim 1 further comprising:

means for supporting said ramp and pad in a free-standing manner on a horizontal surface; and means for preventing movement of said device relative to said horizontal surface when a ball impacts said ramp and pad.

3. A device according to claim 2 wherein said supporting means comprises a pair of spaced side members, said spaced side members extending rearwardly from the vicinity of said side edges; means for holding said side members in a fixed position relative to each other and said ramp when the device is in use, said device having a base portion and wherein said means for preventing movement of said device relative to said horizontal surface comprises means extending from said base portion for engaging said horizontal surface.

4. A device according to claim 3 wherein said spaced side members comprise wall members, said base portion comprises means extending horizontally between said wall members and said horizontal surface engaging means comprises a plurality of elongated parallel members extending downwardly from said horizontally extending means of said base portion.

5. A device according to claim 1 comprising means forming an upstanding rib member extending from each of said side edges for preventing undesired lateral movement of a ball over said side edges.

6. A device according to claim 1 further comprising a top portion and means for attaching said pad on said top portion.

7. A device according to claim 6 wherein said attaching means comprises a female engaging means disposed in said top portion and a male engaging means extending from said pad for engaging said female engaging means.

8. A device according to claim 7 wherein said male engaging means is a T-shaped member and said female engaging means is a T-shaped channel.

*9. A bowling practice device comprising means for receiving a rolling bowling ball, said receiving means comprising means having parallel edges for centering said rolling bowling ball with respect to the longitudinal axis of said receiving means and means forming an upwardly inclined curved surface for reducing the forward velocity of the ball and returning the ball to the roller thereof.*

*10. A bowling practice device according to claim 9 wherein said receiving means comprises a lower forward edge and an upper edge and said upwardly inclined curved surface is curved upwardly from said lower forward edge toward said upper edge with respect to at least the lower part thereof and said parallel edges extend substantially the entire length of said receiving means between said lower and said upper edges for centering said ball with respect to the longitudinal axis of said receiving means anytime the*

*ball moves away from said longitudinal axis after impacting said receiving means.*

*11. A bowling practice device according to claim 9 wherein said centering means comprises a curved surface which slopes upwardly from the longitudinal axis of said receiving means.*

*12. A bowling practice device according to claim 9 wherein said centering means comprises means for directing a bowling ball moving laterally from the longitudinal axis of said receiving means toward said longitudinal axis anytime the ball is moved away from said longitudinal axis after impacting said receiving means.*

*13. A method of making an apparatus for practicing bowling comprising the steps of:*

*forming a bowling ball receiving means comprising an upwardly inclined curved ball receiving surface for reducing the forward velocity of a bowling ball rolled onto said surface; and*

*providing means having parallel edges for deflecting a ball moving laterally from said ball receiving surface toward said ball receiving surface.*

*14. A method according to claim 13 comprising the step of providing a surface which curves symmetrically upwardly from the longitudinal axis of said ball receiving surface for centering a ball relative to the longitudinal axis of said ball receiving surface.*

*15. A method according to claim 13 wherein said step of deflecting a ball moving laterally from said ball receiving surface toward said ball receiving surface comprises the step of providing a vertically extending wall member outside of the laeral edges of said ball receiving surface.*

*16. A method of making an apparatus for practicing bowling comprising the steps of:*

*providing a bowling ball receiving surface which is upwardly inclined and curved over substantially its entire length for reducing the forward velocity of a bowling ball rolled onto said surface;*

*providing means for centering a bowling ball on said ball receiving surface so that a ball, rolled onto said surface, will be returned by gravity to the roller thereof along a line collinear to the longitudinal axis of said ball receiving surface; and*

*providing means having parallel edges for deflecting a ball moving laterally from said ball receiving surface toward said ball receiving surface.*

*17. A method according to claim 16 wherein said step of providing means having parallel edges for deflecting a ball toward said ball receiving surface comprises the step of providing a vertically extending wall member adjacent to the lateral edges of said ball receiving surface.*

* * * * *